(12) United States Patent
Kirillov

(10) Patent No.: US 12,205,462 B2
(45) Date of Patent: Jan. 21, 2025

(54) METHOD FOR WARNING DRIVERS ABOUT PRESENCE OF A PEDESTRIAN ON A PEDESTRIAN CROSSING

(71) Applicant: Aleksandr V. Kirillov, Moscow (RU)

(72) Inventor: Viktor N. Kirillov, Moscow (RU)

(73) Assignee: Aleksandr V. Kirillov, Moscow (RU)

( * ) Notice: Subject to any disclaimer, the term of this patent is extended or adjusted under 35 U.S.C. 154(b) by 43 days.

(21) Appl. No.: 18/022,161

(22) PCT Filed: Aug. 10, 2021

(86) PCT No.: PCT/RU2021/050255
§ 371 (c)(1),
(2) Date: Feb. 19, 2023

(87) PCT Pub. No.: WO2022/039633
PCT Pub. Date: Feb. 24, 2022

(65) Prior Publication Data
US 2023/0316906 A1   Oct. 5, 2023

(30) Foreign Application Priority Data

Aug. 20, 2020 (RU) .......................... RU2020127798

(51) Int. Cl.
G08G 1/095 (2006.01)
G08G 1/005 (2006.01)
G08G 1/052 (2006.01)
G08G 1/09 (2006.01)
G08G 1/16 (2006.01)

(52) U.S. Cl.
CPC ............... *G08G 1/09* (2013.01); *G08G 1/005* (2013.01); *G08G 1/052* (2013.01); *G08G 1/166* (2013.01)

(58) Field of Classification Search
CPC .......... G08G 1/09; G08G 1/005; G08G 1/052; G08G 1/166
See application file for complete search history.

(56) References Cited

U.S. PATENT DOCUMENTS

| 3,863,251 | A | * | 1/1975 | Gould | .................... | G08G 1/005 |
| | | | | | | 340/944 |
| 6,104,313 | A | * | 8/2000 | Boyd, II | .................... | E01F 9/65 |
| | | | | | | 340/925 |
| 6,243,644 | B1 | * | 6/2001 | Dengler | .................... | G08G 1/01 |
| | | | | | | 340/933 |

(Continued)

*Primary Examiner* — Quang Pham
(74) *Attorney, Agent, or Firm* — Alexander Rabinovich Patentagar PLLC

(57) ABSTRACT

The invention relates to a method of warning drivers about the presence of pedestrians on a pedestrian crossing. The technical result consists in increasing road safety. The appearance of each pedestrian on the pedestrian crossing is detected by a detector. The information, thus obtained, is analyzed by a control unit, and the location of the pedestrian on the pedestrian crossing is determined. Also provided is a viewscreen mounted above the pedestrian crossing over the entire width of the road, such that traffic is able to pass freely under it, and above sections adjacent to the crossing on both sides of the road. The information about the location of the pedestrian is transmitted from the control unit to the viewscreen in real time and is displayed on the viewscreen as a moving rectangle or a moving silhouette of the pedestrian.

9 Claims, 2 Drawing Sheets

(56) References Cited

U.S. PATENT DOCUMENTS

| | | | | |
|---|---|---|---|---|
| 7,688,222 B2* | 3/2010 | Peddie | ............ | G08G 1/096783 |
| | | | | 116/63 P |
| 7,852,234 B1* | 12/2010 | Borenstein | ............... | G08G 1/07 |
| | | | | 340/925 |
| 8,081,087 B2* | 12/2011 | Jones | ...................... | G09F 13/04 |
| | | | | 340/925 |
| 8,228,210 B2* | 7/2012 | Sitbon | ................... | G08G 1/095 |
| | | | | 340/944 |
| 9,934,685 B1* | 4/2018 | Bernhardt | ............... | G08G 1/005 |
| 10,068,473 B1* | 9/2018 | Harrison | ............... | G08G 1/0965 |
| 10,269,243 B1* | 4/2019 | Tannenbaum | ..... | G08G 1/09623 |
| 11,355,006 B1* | 6/2022 | Cho | ................. | G08G 1/096708 |
| 11,587,438 B2* | 2/2023 | Nishimura | ............. | G08G 1/052 |
| 11,810,453 B2* | 11/2023 | Nishimura | ............. | G08G 1/164 |
| 11,926,344 B1* | 3/2024 | Roy | ........................ | G08G 1/04 |
| 2004/0027828 A1* | 2/2004 | Awa | ....................... | G08G 1/095 |
| | | | | 362/259 |
| 2004/0183694 A1* | 9/2004 | Bauer | .................... | G08G 1/095 |
| | | | | 340/933 |
| 2005/0174776 A1* | 8/2005 | Althaus | ................... | F21V 33/00 |
| | | | | 362/183 |
| 2005/0270175 A1* | 12/2005 | Peddie | ............ | G08G 1/096783 |
| | | | | 246/473 R |
| 2008/0272936 A1* | 11/2008 | Kim | ...................... | G08G 1/095 |
| | | | | 340/944 |
| 2010/0102991 A1* | 4/2010 | Hernandez | ............... | G08G 1/02 |
| | | | | 340/944 |
| 2012/0166072 A1* | 6/2012 | Tamaoki | ......... | B60W 30/18154 |
| | | | | 701/300 |
| 2012/0182140 A1* | 7/2012 | Kumabe | ................ | G08G 1/161 |
| | | | | 340/435 |
| 2012/0206483 A1* | 8/2012 | Funabashi | ........ | G08G 1/096783 |
| | | | | 345/629 |
| 2012/0223843 A1* | 9/2012 | Wall | ....................... | G08G 1/095 |
| | | | | 340/944 |
| 2013/0049990 A1* | 2/2013 | Shi | ........................... | G08G 1/07 |
| | | | | 340/907 |
| 2015/0084791 A1* | 3/2015 | Jang | ......................... | G08G 1/07 |
| | | | | 340/944 |
| 2015/0094878 A1* | 4/2015 | Miura | ................... | B60W 30/09 |
| | | | | 701/1 |
| 2017/0038018 A1* | 2/2017 | Johnson | ................... | F21V 21/14 |
| 2017/0148317 A1* | 5/2017 | Diba | ...................... | G08G 1/142 |
| 2017/0255093 A1* | 9/2017 | Fujita | .................... | G01S 13/931 |
| 2018/0033306 A1* | 2/2018 | Kim | ....................... | G06V 40/103 |
| 2018/0096595 A1* | 4/2018 | Janzen | ................... | G06V 10/94 |
| 2019/0018419 A1* | 1/2019 | Lee | ............... | G08G 1/096708 |
| 2019/0035263 A1* | 1/2019 | Loes | ....................... | G08G 1/095 |
| 2019/0088112 A1* | 3/2019 | Jung | ........................ | G08G 1/166 |
| 2019/0096242 A1* | 3/2019 | Gao | ........................ | G08G 1/087 |
| 2019/0270446 A1* | 9/2019 | Watanabe | ............. | B60W 10/18 |
| 2020/0108826 A1* | 4/2020 | Kim | ................. | B60W 30/18159 |
| 2020/0265719 A1* | 8/2020 | Swan | ..................... | G08G 1/166 |
| 2020/0388158 A1* | 12/2020 | Tate | ........................ | G08G 1/166 |
| 2021/0229703 A1* | 7/2021 | Domeyer | ............. | G05D 1/0276 |
| 2021/0240972 A1* | 8/2021 | Austin | ................. | G06V 20/593 |
| 2021/0280054 A1* | 9/2021 | Tonguz | ................. | G08G 1/005 |
| 2021/0287533 A1* | 9/2021 | Gaurav | ..................... | G08G 1/07 |
| 2021/0291836 A1* | 9/2021 | Cho | ................... | B60W 30/18054 |
| 2021/0300359 A1* | 9/2021 | McGill | ............ | G08G 1/096741 |
| 2021/0316750 A1* | 10/2021 | Jo | ................... | B60W 30/18154 |
| 2021/0327267 A1* | 10/2021 | Kanade | ................... | G08G 1/096 |
| 2021/0331706 A1* | 10/2021 | Kim | ..................... | B60W 60/0027 |
| 2021/0370823 A1* | 12/2021 | Stein | .................... | G06V 20/588 |
| 2021/0394793 A1* | 12/2021 | Austin | ................. | G08G 1/0112 |
| 2022/0130254 A1* | 4/2022 | Austin | ..................... | H04W 4/46 |
| 2022/0254252 A1* | 8/2022 | Nishimura | ............... | G08G 1/02 |
| 2023/0008967 A1* | 1/2023 | Iun | ...................... | G08G 1/0141 |
| 2023/0117848 A1* | 4/2023 | Ferenets | ............... | G05D 1/0214 |
| | | | | 342/70 |
| 2023/0121234 A1* | 4/2023 | Camras | ................... | H05B 47/19 |
| | | | | 340/944 |
| 2024/0001951 A1* | 1/2024 | Gray | ..................... | B60W 40/08 |
| 2024/0085209 A1* | 3/2024 | Misumi | ................... | G08G 1/16 |

* cited by examiner

METHOD FOR WARNING DRIVERS ABOUT PRESENCE OF A PEDESTRIAN ON A PEDESTRIAN CROSSING

CROSS-REFERENCE TO RELATED APPLICATIONS

The current application is a CIP U.S. National entry of International application PCT/RU2021/050255 filed Aug. 10, 2021, claiming priority from Russian national application RU 2020127798 filed Aug. 20, 2020, the entire content of both applications being incorporated herein by reference.

BACKGROUND OF THE INVENTION

The invention relates to traffic management, and particularly to methods of warning drivers about the presence of pedestrians on a pedestrian crossing (PC). The invention can be used to decrease the probability of auto-pedestrian accidents on, preferably, uncontrolled PC.

Known from U.S. Pat. No. 10,290,213 published May 14, 2019 (EP3336822A1 of Jun. 20, 2018) has been a method and a system for drawing attention to a person crossing a PC. The system comprises at least two traffic signs in connection with each other through the PC, at least one control device operationally connected to the traffic sign, at least one detector, at least one light source within the traffic sign, and at least one illumination device to illuminate the person. In the system, the control device is arranged to receive information from at least one detector, and based on said information determine the position of the person on the PC or outside of it, and when the person is located outside the PC, to activate at least one light source and/or illumination device of the traffic sign, and to send information to at least one other traffic sign to activate at least one light source and/or illumination device of said at least one other traffic sign.

It is believed that the prior art method provides an insufficient level of driver awareness about probable danger on the PC, and it is a drawback of the known method. So, the technical problem is eliminating the above drawback.

The technical result is higher road safety by way of better driver and pedestrian awareness at the PC area.

SUMMARY OF THE INVENTION

The problem is solved, and the result is reached, in the method of warning drivers about the presence of a pedestrian on the PC, the method comprising detecting the appearance of every pedestrian on the PC by a detector, analyzing the information thus obtained by a control unit, defining the place of the pedestrian on the PC, and transmitting this information to a PPIU to warn drivers of upcoming vehicles, wherein, according to the invention, the PPIU includes a viewscreen installed above the PC and adapted to let the vehicles pass freely under it. The viewscreen, presenting the pedestrian as a deemed figure, displays the actual position of the pedestrian on the road. The viewscreen is placed over the whole width of the road and over areas adjoining the road on its both sides. The information is displayed on both sides of the viewscreen thus informing drivers of the two-way traffic.

Information about pedestrians approaching the PC can be displayed on the portions of the viewscreen placed above the adjoining areas. The viewscreen can include an at least one netlike viewscreen with luminous elements placed at the nodes of the netlike viewscreen. The viewscreen can alternatively include two netlike viewscreens installed one after another and comprising luminous elements at the nodes of both viewscreens. A net pitch of one viewscreen is larger than a net pitch of another viewscreen.

Luminous elements of the viewscreen having a larger net pitch can be turned on when a pedestrian is detected in the area of the PC, thus drawing drivers' attention to the PC, whereas a deemed figure of the pedestrian is displayed on the viewscreen having the net with a smaller pitch. Also, the detector can detect the position of the vehicle approaching the PC, and if at that time a pedestrian happens to be on the PC, an acoustic signal can be used to warn the pedestrian about the upcoming vehicle.

Also, the speed of the upcoming vehicle can be evaluated by the detector and, depending on the speed of its approaching, the signal strength can vary. If there is no pedestrians in the area of the PC, auxiliary information can be displayed on the viewscreen. Additionally, the light intensity of the viewscreen can be changed subject to the degree of ambient light illumination.

BRIEF DESCRIPTION OF DRAWINGS

The invention is elaborated by the drawings, where.

DETAILED DESCRIPTION OF THE INVENTION

The system implementing the proposed method comprises a detector 1, for which a radar can be used, a control unit (CU) 2, and an information unit 3, for which a viewscreen is used, installed above the area 4 of the PC adapted to let the traffic pass freely under it.

Figure 1:
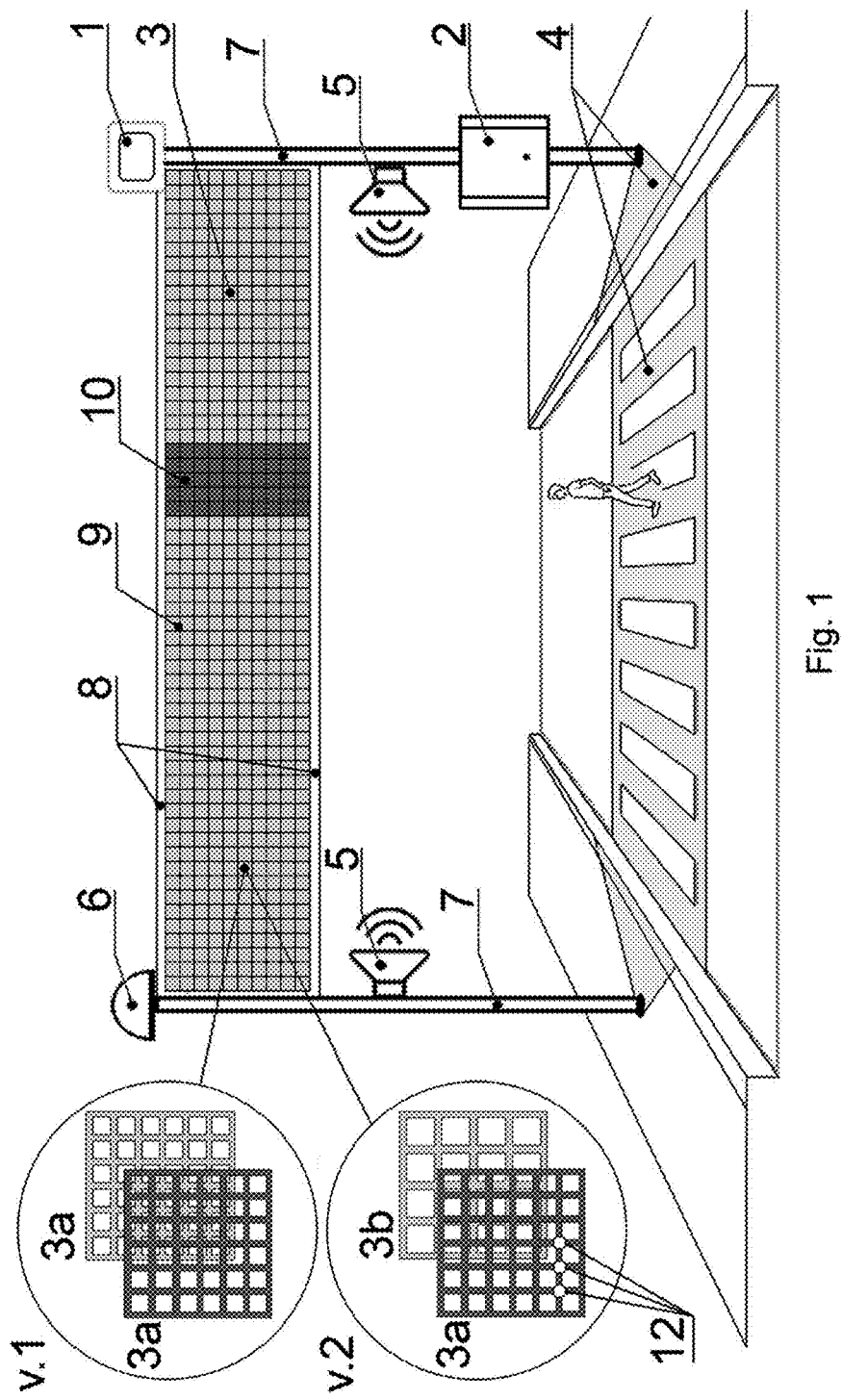
FIG. 1 shows the system implementing the claimed method and using two netlike viewscreen with unequal pitch of luminous elements and a deemed figure of the pedestrian on them.

The viewscreen can include at least one netlike viewscreen with luminous elements at the net nodes, or two netlike viewscreens installed one behind the other with luminous elements at the net nodes, a net pitch of one viewscreen being equal to a net pitch of the other, as shown in detailed view v.1 in FIG. 1, or a net pitch of one viewscreen being larger than a net pitch of the other, as detailed view v.2 in FIG. 1 illustrates.

The proposed method is implemented as follows. At least one radar 1 installed on a support 7 located off the roadway generates a signal about the presence of a pedestrian on the PC.

It is understood that each time a pedestrian is mentioned, a large animal can be an object of the proposed method instead.

Figure 2:
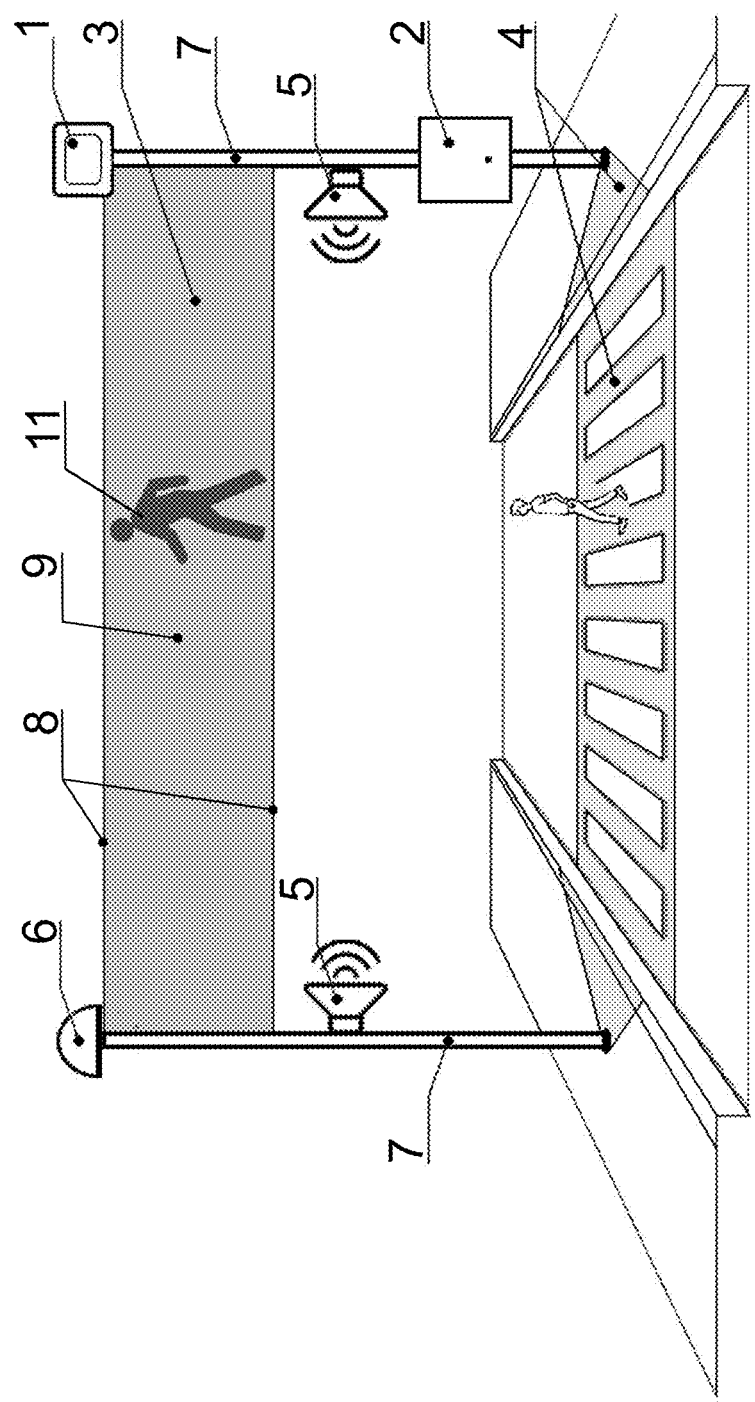
FIG. 2 illustrates the system having the viewscreen showing a moving figure of the pedestrian.

The radar 1 detects people in the area 4 of the PC and that adjoining it (see FIGS. 1 and 2). It helps warn drivers beforehand for them to have enough time to smoothly decrease speed.

The radar 1 has technical capability to provide the CU2 with raw information, which is sufficient for the CU2 to locate a pedestrian on the PC with high precision and to differentiate the pedestrian from small animals, vehicles, domestic waste, such as plastic bags flying in the air, and other objects other than a human being or a large animal.

The detection a pedestrian on that portion of the area 4, which is preset when the system is assembled and which is not a PC but immediately adjoins it, is presumed as the pedestrian's intention to cross the road. When this fact is established, a signal is supplied to the viewscreen 3 to turn it on.

The signal received from the radar 1 and processed in the CU 2 defines not only the presence of pedestrians on the PC and their number but also the exact place of each pedestrian on the PC at each specific point of time. After receiving the signal from the radar 1, the CU 2 analyzes the signal and, upon detecting one or more human being, sends relevant signals to the viewscreen 3 which, by using corresponding light signals, informs drivers about the presence of one or more pedestrians on the PC indicating their particular position on the PC at each specific point of time.

Since the radar 1 is capable of detecting and keeping track of several hundred objects and of identifying their speed, the system can be provided with the additional possibility of warning a pedestrian, using an acoustic signal from a respective acoustic unit 5, about, for example, an upcoming speeding vehicle.

If objects unrelated to pedestrians appear in the area 4, the CU 2 is capable, using data from the radar 1, of differentiating them from people and sending a signal to the viewscreen 3 due to absence of such necessity. This contributes to avoiding false warning of drivers.

The viewscreen 3, which receives signals from the CU 2 and serves to warn drivers about the presence of people in the area, can be made in many various embodiments. Each of them, however, must provide the driver with the information about particular position of a pedestrian, or pedestrians, on the PC. Subject to the price of the viewscreen 3, the information presented can be a silhouette 11 of a moving human being or a vertical-oriented rectangle 10 of an alarming color against a luminous (yellow, for example) background 9 of the viewscreen 3 which is turned on. This rectangle is created by successive turning on/off of respective color elements of the view screen 3 located immediately above each pedestrian on the PC.

Each of the embodiments suggests mounting at least one viewscreen 1 on the supports 7 on both sides of the road, the viewscreen being at such height over the road that presents no obstacle for any vehicle moving under it. If separate informing is provided for same- and opposite direction traffic, mounting additional viewscreens 3 next to each other is possible. The first embodiment comprises two supports 7 on either side of the road with an upper and a lower metal ropes 8 tightened between them. Mounted on, and stretched between, those ropes 8 next to each other are two monochrome (one-color) LED (comprising LED 12) or similar nets resembling holiday decorations and glowing sufficiently for drivers to see it, the luminous elements being located in nodes of the net. They give a warning about the presence of a pedestrian on the PC to drivers of both traffic directions.

One of the nets (3b in FIG. 1) can have large enough distance between the luminous elements (FIG. 1, v. 2), be non-programmable and be turned on in full when a signal about the presence of the pedestrian on the PC is received from the CU 2. In other words, when a pedestrian is detected in the area 4, all luminous elements of this set are turned on. They glow simultaneously (for example, in pulsing yellow color to better attract driver's attention) till no person is left in the area 4. Also, alternating with pulsing yellow screen 9, a caution sign ATTENTION! can appear on the viewscreen 3.

The second LED, or similar, viewscreen (3a in FIG. 1) can have a lesser distance between the luminous elements (see FIG. 1, v. 2) for detailed elaboration of the information presented. The second viewscreen is programmable, is controlled by the CU 2, and each of the elements it comprises is turned on when a pedestrian is under it, thus sending a signal to a driver about the exact position of the pedestrian on the PC.

In the cheapest embodiment, the luminous elements of the second LED or similar viewscreen form vertical red-light rectangles 10 immediately above those particular places of the PC where at every particular moment pedestrians are, the rectangles moving along the viewscreen following pedestrians when they move on the PC.

If a pedestrian is in the area 4 but has not stepped onto the PC surface yet, the intention of the pedestrian to make use of the PC presents no doubts for the CU 2, and red-light vertical rectangles 10 are turned on that side of the viewscreen which is above the adjoining area where the pedestrian is. This serves the purpose of providing drivers information in advance about location of the pedestrians in the area of the PC and their intention to enter the PC.

The second embodiment suggests having two separate viewscreens between the supports 7, each viewscreen sending information only to drivers of vehicles bound for one direction. Each viewscreen 3 is of high quality and is capable of displaying any multicolor moving picture. As a matter of fact, this is a monitor or TV set rather a holiday decoration.

When a pedestrian is detected on the PC or in close proximity to it, the whole surface of both viewscreens 3 starts to glow in yellow, except those particular areas that are immediately above the pedestrian.

Moving pictures imitating moving silhouettes of pedestrians, including the stylistic conventions of moving arms and legs, are displayed on the viewscreen areas immediately under which pedestrians are. Due to that, a driver is pointedly warned about the presence of one or more pedestrians on the PC (FIG. 2).

If a pedestrian is in the area 4 but has not stepped onto the PC surface yet, the intention of the pedestrian to make use of the PC presents no doubts for the CU 2, and the moving pictures imitating moving silhouettes of pedestrians are displayed on the area of the viewscreen 3 which is above the adjoining area where the pedestrian is. This serves the purpose of providing drivers information in advance about location of the pedestrians in the area of the PC and their intention to enter the PC.

Since the viewscreen 3 in the second embodiment can display practically any picture, the CU 2 can be customized so that the viewscreen display, apart from a moving human silhouette, any other additional information that can help driver be better aware about the situation on the PC (for example, information about the speed of an upcoming vehicle if the speed is exceeded). When the second embodiment is implemented, the viewscreen 3 can be used, at the time length when there are no pedestrians on the PC, for displaying clips containing other information of, for example, social or commercial character.

In this case, if a pedestrian appears on the PC or in close proximity to it, displaying the "other" information is temporarily suspended, the viewscreen 3 is switched back to its basic mode of operation—to warn drivers about the presence of pedestrians on the PC. After the pedestrian completed crossing the road, the viewscreen 3 is again switched to displaying the "other" information, until the necessity emerges for the viewscreen 3 to work for the intended purpose.

Displaying commercial information when there is no pedestrians on the PC, can allow, at the expense of displaying this information, to install more viewscreens 3 of good quality (the second embodiment) to better inform drivers and thus improve safety of pedestrians.

As day- and nighttime require different light intensities of the viewscreen 3 for the best informing of drivers, the regulating of light intensity of the transmitted signal, subject to brightness of the PC, can be provided. For that, a light intensity sensor 6 can be connected to the CU 2, and the light intensity of the viewscreen 3 will be regulated based on the information from the sensor.

As an example of the units of the above-described system implementing the proposed method, a radar sensor K50RPF-8060-LDQ of Banner Engineering can be referred to as the detector (radar) 1, a Raspberry Pi 4 Model B computer of Raspberry Pi Foundation and Broadcom—in the capacity of the CU 2, LED screens Lightking EA1515 of Ltghtking Tech Group Co., Ltd in the function of the viewscreen 3, a siren Diponto DP300 of Diponto acting as the acoustic unit 5, and an outdoor light sensor AHKF-U Photosgard of S+S Regeltechnik GmbH as the light intensity sensor 6.

The use of the proposed method will have maximum effect during darkness hours, as well as where there is multi-lane traffic and "blind" areas in some lanes. Such situation may occur, for example, when a vehicle stopped to yield a pedestrian, thus interfering with line-of-sight and creating a blind spot for drivers on adjacent lanes. The method meets the challenge equally well irrespective of the season, the time of day and weather conditions.

Therefore, the use of the method secures improvement of the road safety due to increased awareness of drivers and pedestrians in the areas of PC.

The invention claimed is:

1. A method of warning drivers about a presence of a pedestrian on a pedestrian crossing (PC) comprising the steps of:
   detecting the presence of the pedestrian on the PC using a detector,
   analyzing in a control unit information obtained from the detector to locate a position of the pedestrian on the PC, and
   sending the information about the position of the pedestrian on the PC to an information unit to inform the drivers of upcoming vehicles about the presence of the pedestrian and the position thereof,
   wherein the information unit includes a viewscreen installed above the PC and adapted to let the upcoming vehicles pass freely thereunder, the viewscreen displaying the position of the pedestrian, shown as a rectangle or a deemed figure, on the PC in real time, the viewscreen being installed above the entire width of a road comprising the PC and areas adjoining the road on both sides thereof, the information being displayed on both sides of the viewscreen thus informing the drivers of the upcoming vehicles of a two-way traffic of the road.

2. The method according to claim 1, wherein the control unit transmits the information about the pedestrian approaching the PC to the viewscreen located above the areas adjoining the road on both sides thereof.

3. The method according to claim 1, wherein the viewscreen includes one net viewscreen having luminous elements at nodes of the one net viewscreen.

4. The method according to claim 1, wherein the viewscreen includes two net viewscreens which are installed one after another and comprise luminous elements at nodes of both viewscreens, a net pitch of one viewscreen being larger than a net pitch of another viewscreen.

5. The method according to claim 4, wherein the luminous elements of the viewscreen having a larger net pitch are turned on upon locating the pedestrian in the area of the PC to attract the drivers' attention to the PC, whereas displayed on the viewscreen having a lesser net pitch is the deemed figure of the pedestrian.

6. The method according to claim 1, further comprising detecting by the detector a location of a vehicle approaching the PC and informing the pedestrian located in the area of the PC about the approaching vehicle using an acoustic signal.

7. The method according to claim 6, further comprising detecting by the detector a speed of the approaching vehicle and changing by the control unit an intensity of the audio signal subject to the speed.

8. The method according to claim 1, further comprising displaying by the control unit auxiliary information on the viewscreen when there is no pedestrian detected by the detector in the area of the PC.

9. The method according to claim 1, further comprising changing by the control unit a light intensity of the viewscreen subject to a degree of ambient light illumination based on a light intensity sensor connected to the control unit.

\* \* \* \* \*